3,445,385
STABLE MINERAL OIL-SILICONE
OIL COMPOSITIONS
Richard Dickran Vartanian, Bound Brook, N.J., assignor to American Cyanamid Company, Stamford, Conn., a corporation of Maine
No Drawing. Filed June 2, 1967, Ser. No. 643,051
Int. Cl. D08m 15/30; C10m 1/52
U.S. Cl. 252—8.8                                         8 Claims

ABSTRACT OF THE DISCLOSURE

This invention relates to a process for the preparation of a silicone oil-in-mineral oil dispersion which comprises agitating a mixture of the two oils having at least 50% mineral oil, in the presence of an organophilic organo-ammonium bentonite, said bentonite material being present in an amount which is effective to maintain the silicone oil homogeneously dispersed throughout the resulting mixture. It relates further to the resulting composition.

---

This invention relates to stable dispersions of organo-silicone polymers in mineral oil and to a method for making them.

Mineral oils and the organosilicone polymers called "silicones" or "silicone oils" are used as lubricants and antistatic finishes on natural and synthetic fibers. The silicones are particularly good lubricant finishes for spandex fibers.

For some applications, it would be highly desirable to apply a combination of mineral oil and silicone oil in a single operation. For many uses, the mineral oil would comprise the major portion of the composition. The problem has been to prepare stable, homogeneous, mineral oil-silicone oil compositions. When mineral oil and a silicone oil are mixed, they soon separate into two phases because of the relative insolubility of silicone oils in mineral oils and the large difference in specific gravity of the two liquids. When high-viscosity mineral oils are used in order to inhibit the separation of the silicone oil, the mixtures become objectionably viscous and are not workable in the intended application.

It is an object of this invention to overcome the aforementioned difficulties by the provision of silicone-mineral oil dispersions of desired viscosity and phase stability. Other objects will be apparent from the following description of this invention.

In accordance with this invention, a method has been discovered for preparing stable, homogeneous dispersions or suspensions of silicone oils in mineral oils, the mineral oil representing at least 50% of the mixture. The stable, homogeneous dispersions of silicone oils in mineral oil are preferably prepared by incorporating a minor proportion of an organophilic organo-ammonium complex of bentonite into the mineral oil under high speed stirring conditions followed by addition of the silicone oil. The resulting dispersion is stable and, on standing, does not separate into its component phases.

Any silicone oil may be used in accordance with this invention. "Silicone oils" include linear polysiloxanes of the formulas:

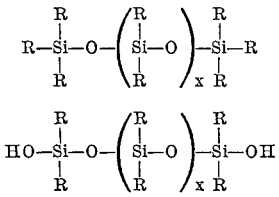

and cyclic polysiloxanes of the formula:

and mixtures thereof, wherein the R's are alkyl or phenyl groups, with not more than one R on each atom of silicon being phenyl. Normally, at least one R on each atom of silicon is a methyl group. In the above formulas, $x$ and $y$ are whole numbers, $y$ being at least 3. Silicone oils are described in "Chemistry of the Silicones" by Rochow, 2nd edition (1951), page 88, and in patents such as U.S. Patents 2,384,384 and 2,469,888. The silicone oils of commerce include polydialkylsiloxanes, such as polydimethylsiloxanes, and polyalkylphenylsiloxanes, particularly the polymethylphenylsiloxanes. Silicone oils of use in this invention also include silicone-glycol copolymers. These may be further described as dialkyl polysiloxanes containing free hydroxyl groups as described in U.S. Patent No. 2,967,171.

Any "organophilic organo-ammonium bentonite" may be used. By said term is meant, organic ammonium complexes of clays of the montmorillonite group, including the swelling bentonite type, particularly complexes of the Wyoming variety of swelling bentonite, and the swelling magnesium bentonite (called hectorite). These complexes are described in U.S. Patent 2,966,506. They can be made by a cation exchange reaction using a bentonitic clay and an organic ammonium salt. The ammonium salt, typically the chloride, contains 1–4 alkyl groups and preferably contains at least 10 carbon atoms. Typical ammonium complexes include dimethyldioctylammonium bentonite,
dimethyldidecylammonium bentonite,
octadecylammonium bentonite,
hexadecylammonium bentonite,
dodecylammonium bentonite,
dimethyldodecylhexadecylammonium bentonite,
dimethyldioctadecylammonium bentonite,
dimethylhexadecyloctadecylammonium bentonite,
dimethyloctadecylbenzylammonium bentonite, etc.

Particularly preferred ammonium complexes are dimethyldioctadecylammonium complexes of bentonite and hectorite.

By "mineral oils" is meant oils of petroleum or other mineral origin. They include the "white mineral oils" which have been processed to remove aromatic and olefinic compounds.

In preparing the stable dispersions of this invention, any order of mixing may be employed. For best results, it is advantageous to add the organophilic organo-ammonium bentonite powder to the mineral oil while vigorously stirring the oil and allowing sufficient time for the powder to be "wetted" by the oil. The silicone oil is then added and the stirring is continued until a homogeneous dispersion of the silicone oil in the mineral oil is obtained.

The mineral oils should represent at least about 50% by weight of the total composition.

Sufficient organophilic bentonite is used to obtain the desired homogeneity of the dispersion. Since the viscosity of the mixture is increased as the amount of organophilic bentonite is increased, it is usually desirable to use the minimum amount of organophilic bentonite that will effectively stabilize the suspension. Additional amounts may be used if it is desired to increase the viscosity of the finished dispersion. The amount used will normally vary between about 0.25% and 8%, usually between about 0.5% and 5%, based on the weight of the total dispersion.

In the following examples, the parts and percentages are by weight. Unless otherwise stated, the viscosities are measured by a Brookfield viscometer using a No. 2 spindle at 60 r.p.m. and 25° C.

EXAMPLE 1

With continuous, high speed stirring, 2 parts of dimethyldioctadecylammonium hectorite (Bentone 38) is slowly added to 78 parts of white mineral oil having a viscosity of 25 cps. after stirring for 30 minutes, 20 parts of a polymethylalkylsiloxane containing some hydroxyl groups (Dow Corning FF-400) is added. The stirring is continued for 30 minutes. The resulting homogeneous dispersion has a viscosity of about 200 cps. The dispersion is stable against phase separation even after long periods of standing.

EXAMPLE 2

With continuous high speed stirring, 50 parts of dimethyldioctadecylammonium hectorite (Bentone 38) is slowly added to 1,950 parts of white mineral oil having a viscosity of 18 cps. After stirring for 30 minutes, 500 parts of a polymethylalkylsiloxane containing some hydroxyl groups is slowly added. After mixing for 15 minutes, the suspension is passed through a colloid mill (0.003" clearance between rotor and stator). The resulting suspension has a viscosity of about 180 cps. The homogeneous dispersion is stable against phase separation.

EXAMPLES 3-8

Various amounts of dimethyldioctadecylammonium hectorite are added slowly to white mineral oil having a viscosity of 18 cps. while stirring at high speed. A polymethylalkylsiloxane containing some hydroxyl groups is added slowly and stirring is continued until maximum homogeneity is obtained. The suspension is examined under the microscope for the degree of dispersion. The amounts of material used and the results obtained are shown in Table I.

TABLE I

| Example | Mineral Oil, percent | Stabilizing Agent, percent | Silicone, percent | Viscosity, cps. | Dispersion |
|---|---|---|---|---|---|
| 3 | 80 | 0 | 20 | 40 | Coarse.[1] |
| 4 | 79.5 | 0.5 | 20 | 43 | Fair. |
| 5 | 79 | 1.0 | 20 | 62 | Fine. |
| 6 | 78 | 2.0 | 20 | 144 | Very fine. |
| 7 | 77 | 3.0 | 20 | 350 | Do. |
| 8 | 76 | 4.0 | 20 | 2 960 | Do. |

[1] The dispersion separates readily into two liquid phases.
[2] Spindle No. 3 used.

EXAMPLES 9-12

The procedure of Examples 3-8 is repeated using a white mineral oil having a viscosity of 25 cps. The amounts of material used and the results obtained are shown in Table II.

TABLE II

| Example | Mineral Oil, percent | Stabilizing Agent, percent | Silicone, percent | Viscosity, cps. | Dispersion |
|---|---|---|---|---|---|
| 9 | 79 | 1 | 20 | 65 | Very fine. |
| 10 | 78 | 2 | 20 | 155 | Do. |
| 11 | 77 | 3 | 20 | 345 | Do. |
| 12 | 76 | 4 | 20 | 1 820 | Do. |

[1] Spindle No. 3 used.

EXAMPLES 13-17

A series of dispersions of silicone oil in mineral oil are prepared using various proportions of silicone and mineral oils. Mineral oil having a viscosity of 25 cps. is stirred at high speed and 2 parts of dimethyldioctadecylammonium hectorite is slowly added. The stirring is continued for 30 minutes and the silicone, a polymethylalkylsiloxane containing some hydroxyl groups, is added slowly and the stirring continued until a uniform dispersion is obtained. The amounts of material used and the results obtained are shown in Table III.

TABLE III

| Example | Mineral Oil, percent | Stabilizing Agent, percent | Silicone, percent | Viscosity, cps. | Dispersion |
|---|---|---|---|---|---|
| 13 | 93 | 2 | 5 | 100 | Very fine. |
| 14 | 88 | 2 | 10 | 125 | Do. |
| 15 | 78 | 2 | 20 | 210 | Do. |
| 16 | 68 | 2 | 30 | 335 | Do. |
| 17 | 58 | 2 | 40 | 500 | Fine. |

EXAMPLES 18-25

A series of dispersions of silicone oil in mineral oil are prepared using various proportions of mineral oil of viscosity of 24 cps., silicone oil and organophilic bentonite. The silicone oil is a polymethylalkylsiloxane containing some hydroxyl groups. The procedure of Example 1 is followed. The viscosities are measured at 30° C. The amounts of materials used and the results obtained are shown in Table IV.

TABLE IV

| Example | Mineral Oil, percent | Stabilizing Agent, percent | Silicone, percent | Viscosity, cps. |
|---|---|---|---|---|
| 18 | 79 | 1.0 | 20 | 60 |
| 19 | 84 | 1.0 | 15 | 56 |
| 20 | 83.5 | 1.5 | 15 | 75 |
| 21 | 84.25 | 0.75 | 15 | 45 |
| 22 | 89 | 1.0 | 10 | 52 |
| 23 | 88.5 | 1.5 | 10 | 85 |
| 24 | 89.5 | 0.5 | 10 | 25 |
| 25 | 87 | 0.5 | 12.5 | 27 |

EXAMPLE 26

The procedure of Example 18 is repeated substituting an equal amount of a polydimethylsiloxane for the polymethylalkylsiloxane containing some hydroxyl groups. The resulting homogeneous suspension is very stable.

EXAMPLE 27

The procedure of Example 18 is repeated substituting an equal amount of a polymethylalkylsiloxane, wherein the alkyl is of medium length, for the polymethylalkylsiloxane containing some hydroxyl groups. The resulting homogeneous suspension is very stable.

EXAMPLES 28-44

A series of dispersions of silicone oil in mineral oil are prepared using a variety of potential stabilizing agents. White mineral oil (78 parts) having a viscosity of 25 cps. is stirred at high speed and 2 parts of a commercial product having potential stabilizing activity is slowly added. After continuing the rapid stirring for 15 minutes, 20 parts of a polymethylalkylsiloxane containing some hydroxyl groups is slowly added. The resulting dispersions are examined microscopically and the time required for separation of the dispersion into two phases is noted as a measure of the stability of the dispersion. The results are shown in Table V.

TABLE V

| Example | Stabilizing Agent | Dispersion |
|---|---|---|
| 28 | Dimethyldioctadecylammonium hectorite. | Very fine; no separation. |
| 29 | Colloidal silica | Fair, separation after several hours. |
| 30 | Modified fatty amine silicate | Poor; separation within 1 hour. |
| 31 | Aluminum stearate | Do. |
| 32 | Distilled mono-glyceride | Do. |
| 33 | Petroleum sulfonate | Do. |
| 34 | Long chain alcohol-ethylene oxide condensate. | Do. |
| 35 | Modified phthalic glycerol alkyd resin. | Do. |
| 36 | Polyisobutylene | Do. |
| 37 | Polymerized soya bean oil | Do. |
| 38 | Modified linseed oil | Do. |
| 39 | Styrene-alkyd copolymer resin | Do. |
| 40 | Ethylene oxide-fatty amine condensate. | Do. |
| 41 | Nonylphenoxypoly(ethyleneoxy)ethanol. | Do. |
| 42 | Alkylphenoxypoly(ethyleneoxy)ethanol. | Do. |
| 43 | Polyoxyethylenesorbitan mono-oleate. | Do. |
| 44 | Poly(vinyl pyrrolidonevinyl acetate). | Do. |

Following the procedures of the foregoing examples, other ammonium complexes such as dimethyldioctylammonium bentonite and dimethyldidecylammonium bentonite were used to prepare stable dispersions of silicone oil in mineral oil.

I claim:
1. A process for the preparation of a non-aqueous silicone oil-in-mineral oil dispersion, having a viscosity effective for application as a finish on fibers, which comprises agitating a mixture of the two oils having at least 50% mineral oil, in the presence of an organophilic organo-ammonium bentonite dispersing agent, said bentonite material being present in an amount which is effective to maintain the silicone oil homogeneously dispersed throughout the resulting mixture.
2. The process of claim 1 wherein the organophilic organo-ammonium bentonite is incorporated into the mineral oil under high speed stirring conditions prior to the addition of the silicone oil.
3. The process of claim 1 wherein the organo-ammonium moiety of the bentonite material is derived from a quaternary ammonium salt which contains at least 10 carbon atoms.
4. The process of claim 1 wherein the dispersant is derived from hectorite.
5. The process of claim 1 wherein from 0.25 to 8.0% of the dispersing agent is used.
6. A composition comprising a non-aqueous mixture of mineral oil and silicone oil having at least 50% mineral oil and containing an effective amount of an organophilic organo-ammonium bentonite dispersing agent, said composition being characterized by stability against separation into phases upon standing and having a viscosity effective for application as a finish on fibers.
7. The composition of claim 6 wherein 0.25 to 8.0% of dispersing agent is present.
8. The composition of claim 6 wherein the bentonite dispersing agent is the dimethyldioctadecylammonium complex of bentonite.

References Cited

UNITED STATES PATENTS 2,805,993   9/1957   Barnard et al. _____ 252—8.8
3,161,594   12/1964  White et al. _____ 252—8.8

DANIEL E. WYMAN, *Primary Examiner.*

I. VAUGHN, *Assistant Examiner.*

U.S. Cl. X.R.

252—28, 49.6